US011244362B2

(12) United States Patent
Sequeira et al.

(10) Patent No.: US 11,244,362 B2
(45) Date of Patent: Feb. 8, 2022

(54) MEASURING USER EXPERTISE UTILIZING NETWORKED SENSING DEVICES

(71) Applicant: International Business Machines Corporation, Armonk, NY (US)

(72) Inventors: Sonia L. Sequeira, Pune (IN); Sachin K. Mahajan, Pune (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 16/132,969

(22) Filed: Sep. 17, 2018

(65) Prior Publication Data

US 2020/0090234 A1     Mar. 19, 2020

(51) Int. Cl.
| G06Q 30/02 | (2012.01) |
| G06Q 30/06 | (2012.01) |
| H04L 29/08 | (2006.01) |
| G06N 20/00 | (2019.01) |

(52) U.S. Cl.
CPC ......... *G06Q 30/0282* (2013.01); *G06N 20/00* (2019.01); *G06Q 30/0627* (2013.01); *G06Q 30/0631* (2013.01); *H04L 67/22* (2013.01); *H04L 67/306* (2013.01)

(58) Field of Classification Search
None
See application file for complete search history.

(56) References Cited

U.S. PATENT DOCUMENTS

| 9,358,442 B2 * | 6/2016 | Mace ................. G09B 19/0038 |
| 9,626,641 B2 | 4/2017 | Pisupati et al. |
| 10,248,983 B1 * | 4/2019 | Ullattil ............... G06Q 30/0623 |
| 2013/0060756 A1 * | 3/2013 | White ............... G06F 16/24575 |
| | | 707/722 |
| 2013/0117329 A1 * | 5/2013 | Bank ..................... G06F 16/954 |
| | | 707/803 |
| 2014/0172744 A1 | 6/2014 | El-Hmayssi et al. |

(Continued)

FOREIGN PATENT DOCUMENTS

| EP | 2945143 A1 * | 4/2015 | ............. G09B 19/00 |
| WO | WO2012021507 A2 * | 2/2012 | ............. G06F 19/00 |

OTHER PUBLICATIONS

S. Aciar, D. Zhang, S. Simoff and J. Debenham, "Informed Recommender: Basing Recommendations on Consumer Product Reviews," in IEEE Intelligent Systems, vol. 22, No. 3, pp. 39-47, May-Jun. 2007, doi: 10.1109/MIS.2007.55. (Year: 2007).*

(Continued)

*Primary Examiner* — Paul R Fisher
(74) *Attorney, Agent, or Firm* — Diana Roberts Gerhardt; Edell, Shapiro & Finnan, LLC (57) ABSTRACT

According to an embodiment of the present invention, a plurality of networked sensing devices monitor one or more activities of a first user, wherein the one or more activities of the first user are associated with a subject area. Information associated with the one or more activities of the first user from the plurality of networked sensing devices is analyzed to determine a level of expertise of the first user with respect to the subject area. A review by the first user is generated for an item offered on a network site, wherein the item pertains to the subject area. The item is displayed on the network site with the review and determined level of expertise of the first user in response to a search for the item for a second user.

11 Claims, 4 Drawing Sheets

(56) References Cited

U.S. PATENT DOCUMENTS

| | | | | |
|---|---|---|---|---|
| 2014/0282098 A1* | 9/2014 | McConnell | .......... | G06Q 10/105 |
| | | | | 715/753 |
| 2015/0019342 A1* | 1/2015 | Gupta | ................ | G06Q 30/0269 |
| | | | | 705/14.66 |
| 2016/0335701 A1 | 11/2016 | Allen et al. | | |
| 2017/0061817 A1* | 3/2017 | Mettler May | .......... | A61B 5/486 |
| 2017/0149928 A1 | 5/2017 | George et al. | | |
| 2017/0178218 A1* | 6/2017 | Feris | ................ | G06Q 30/0631 |
| 2017/0323368 A1* | 11/2017 | Eastman | ............ | G06Q 30/0631 |
| 2017/0372215 A1* | 12/2017 | Platt | ...................... | G06F 16/245 |
| 2018/0012283 A1* | 1/2018 | Harve | ................ | G06Q 30/0631 |
| 2018/0349861 A1* | 12/2018 | Goja | ................ | G06Q 10/0834 |
| 2019/0114690 A1* | 4/2019 | Paquette | ............ | G06Q 30/0282 |

OTHER PUBLICATIONS

A. Larson and A. Smith, "Sensors and data retention in grand Slam tennis," 2018 IEEE Sensors Applications Symposium (SAS), 2018, pp. 1-6, doi: 10.1109/SAS.2018.8336712. (Year: 2018).*

T. Mitsui, S. Tang and S. Obana, "Support system for improving golf swing by using wearable sensors," 2015 Eighth International Conference on Mobile Computing and Ubiquitous Networking (ICMU), 2015, pp. 100-101, doi: 10.1109/ICMU.2015.7061049. (Year: 2015).*

King, Peter. "Tech Review: Play Tennis, Follow News with Apps." Newsday, Aug. 28, 2016, p. n/a. ProQuest. Web. Nov. 20, 2021 (Year: 2016).*

Pickup (music technology), Wikipedia, https://en.wikipedia.org/wiki/Pickup_%28music_technology%29, retrieved from internet Sep. 2018, 12 pages.

Ridden, New sensor digitally captures complex guitar-playing movements, http://newatlas.com/thin-film-digital-sensor-for-guitar/19-196/, Jul. 12, 2011, 6 pages.

Johnson, Tennis gadgets and trackers to improve your game, http://gadgetsandwearables.com/2017/07/13/a-round-up-of-tennis-gadgets-and-trackers/, Jul. 13, 2017, 13 pages.

* cited by examiner

MEASURING USER EXPERTISE UTILIZING NETWORKED SENSING DEVICES

BACKGROUND

1. Technical Field

Present invention embodiments relate to networked sensing systems, and more specifically, to measuring user expertise with respect to a subject area or topic based on monitoring user activity relating to that subject area utilizing networked sensing devices.

2. Discussion of the Related Art

Internet e-commerce sites and shopping applications are increasingly being used, while the items (e.g., products, services, etc.) that are being marketed are becoming of greater complexity. Online shopping customers typically rely on reviews when purchasing a new item that the customer has not previously utilized. Current reviews are typically based on a star rating, where a quantity of stars assigned to an item indicates a reviewer opinion of the item.

Although this type of review along with a review description may provide confidence to a customer interested in purchasing an item, the customer remains unaware of the expertise of the person providing the review. Further, the person providing the review may not have much subject knowledge about the item. In this case, the review may be based on personal experience with respect to their use of the item which may be very different from a usage pattern of a customer seeking to purchase the item. In addition, since reviews are provided by users, there is no absolute way of determining whether the reviews are fake, biased, or genuine.

SUMMARY

According to an embodiment of the present invention, a system for measuring user expertise includes a plurality of networked sensing devices and a processor. The plurality of networked sensing devices monitor one or more activities of a first user, wherein the one or more activities of the first user are associated with a subject area. Information associated with the one or more activities of the first user from the plurality of networked sensing devices is analyzed to determine a level of expertise of the first user with respect to the subject area. A review by the first user is generated for an item offered on a network site, wherein the item pertains to the subject area. The item is displayed on the network site with the review and determined level of expertise of the first user in response to a search for the item for a second user. Embodiments of the present invention further include a method and computer program product for measuring user expertise in substantially the same manner described above.

BRIEF DESCRIPTION OF THE DRAWINGS

Generally, like reference numerals in the various figures are utilized to designate like components.

DETAILED DESCRIPTION

Present invention embodiments measure an expertise (e.g., skill level, knowledge, experience, etc.) of a reviewer of an item (e.g., goods, products, services, etc.) on a network site by monitoring activity of the reviewer pertaining to the item. The measured expertise provides an indication of credibility of the reviewer. Accordingly, the expertise (and credibility) of the reviewer is automatically established and refined based on the measured activity, rather than by intuition of users seeking to purchase the item.

Present invention embodiments determine the expertise of a user based on utilizing contextual networked sensing devices (e.g., Internet of Things (IoT) devices, etc.). In addition, present invention embodiments also dynamically and cognitively adjust the expertise based on an improving or degrading skill set as measured by the networked sensing devices.

Figure 1:
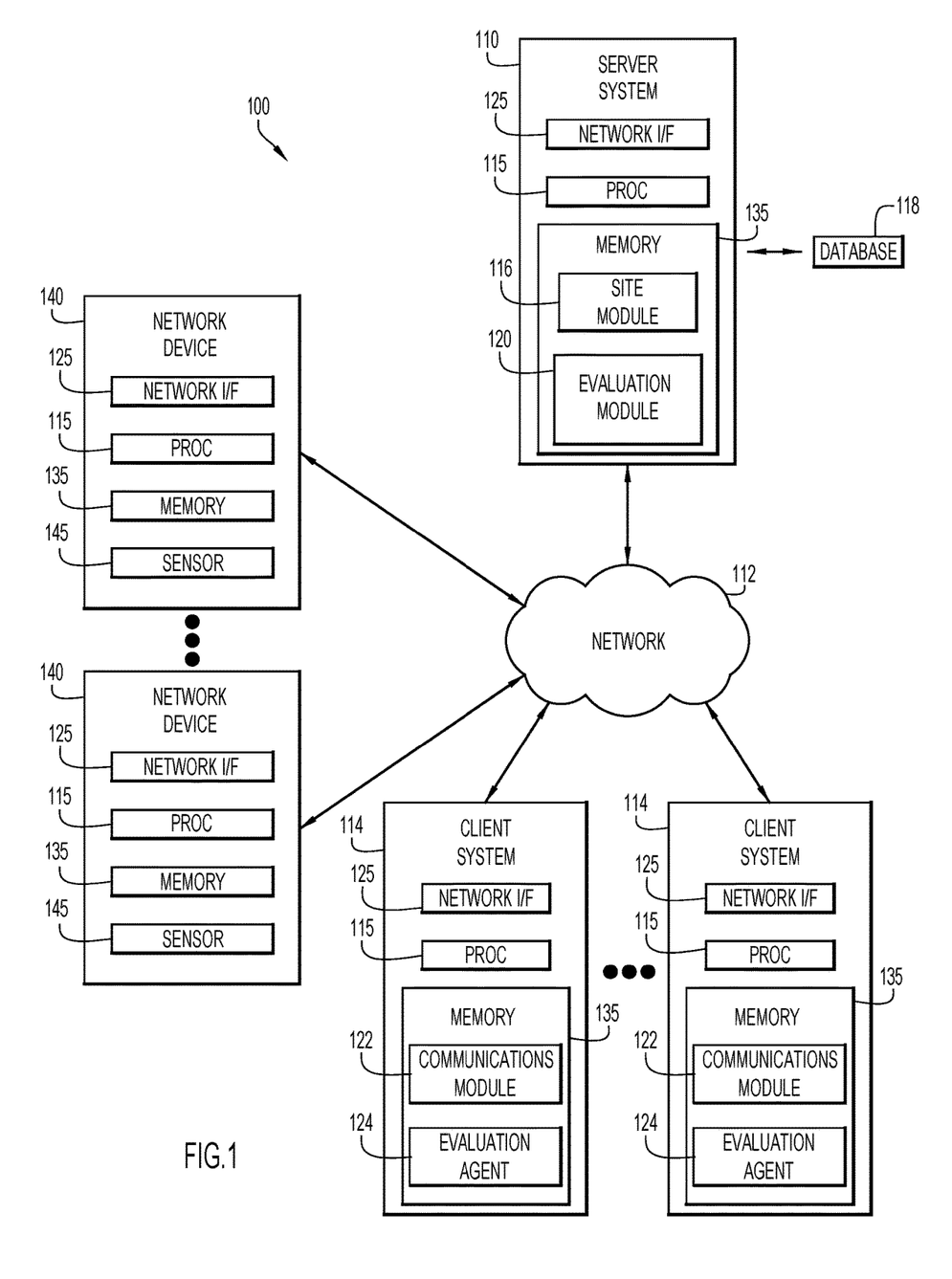
FIG. 1 is a diagrammatic illustration of an example computing environment according to an embodiment of the present invention.

An example environment for use with present invention embodiments is illustrated in FIG. 1. Specifically, an environment 100 includes one or more server systems 110, one or more client or end-user systems 114, and one or more network devices 140. Server systems 110, client systems 114, and network devices 140 may be remote from each other and communicate over a network 112. The network may be implemented by any number of any suitable communications media (e.g., wide area network (WAN), local area network (LAN), Internet, Intranet, etc.). Alternatively, server systems 110, client systems 114, and/or network devices 140 may be local to each other, and communicate via any appropriate local communication medium (e.g., local area network (LAN), hardwire, wireless link, Intranet, etc.).

Client systems 114 enable users to interact with server systems 110 to perform various actions (e.g., register reviewers and purchasers, access e-commerce or other network sites, initiate transactions, perform searches, etc.). The server systems include a site module 116 to perform various actions for a network site (e.g., e-commerce site, etc.), and an evaluation module 120 to evaluate expertise (e.g., skill level, knowledge, experience, etc.) of reviewers and purchasers based on activities monitored by network devices 140. The evaluation module may be included within, or coupled to, site module 116. A database system 118 may store various information for the analysis (e.g., user profile information, collected data from network devices 140, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.).

Client systems 114 may include a communications module 122 (e.g., a browser, network interface, etc.) and an evaluation agent 124. The communications module communicates with server systems 110 over network 112. The communications module may present a graphical user (e.g., GUI, etc.) or other interface (e.g., command line prompts, menu screens, etc.) to solicit information from users pertaining to the desired actions (e.g., registration, transactions, navigation to network sites, searches, etc.). Evaluation agent 124 may be provided to client systems 114 by evaluation module 120, or be pre-installed on the client systems from other sources. Evaluation agent 124 communicates with network devices 140 to collect data from the network devices pertaining to monitored activities of users. Client systems 114 may be implemented by various types of computing devices (e.g., desktop or portable computer system, portable processing device, cellular telephone, etc.).

Server systems 110 and client systems 114 may be implemented by any conventional or other computer systems preferably equipped with a display or monitor, a base or housing, optional input devices (e.g., a keyboard, mouse or other input device), and any commercially available and custom software (e.g., server/communications software, browser/interface software, evaluation module, site module, evaluation agent, etc.). The base or housing includes at least one hardware processor 115 (e.g., microprocessor, controller, central processing unit (CPU), etc.), one or more memories 135, and/or internal or external network interfaces or communications devices 125 (e.g., modem, network cards, etc.)).

Network devices 140 may be preferably equipped with at least one hardware processor 115 (e.g., microprocessor, controller, central processing unit (CPU), etc.), one or more memories 135, internal or external network interfaces or communications devices 125 (e.g., transceiver, network cards, etc.)), and/or optional input or output devices (e.g., a keyboard, mouse or other input device, a display, etc.). The network devices may further include one or more sensors 145, and any commercially available or custom software and/or hardware modules for the particular device to perform device operations (e.g., applications, browser, communications software, etc.).

Network devices 140 may include any suitable devices that may sense, collect, and/or provide data. For example, network devices 140 may include one or more sensors 145 (e.g., medical, physiological, external conditions, device internal conditions, motion, position, orientation, acceleration, velocity, sound, force, etc.) to provide data. Alternatively, network devices 140 may be implemented by any devices otherwise collecting data, measurements, and/or readings (e.g., desktop or portable computer system, portable processing device, cellular telephone, appliance, instrument, activity or sports equipment, vehicle, medical device, meters, exercise machine or device, etc.). This data may be stored internally and/or shared across network 112.

The site module, evaluation module, communications module, and evaluation agent may include one or more modules or units to perform the various functions of present invention embodiments described below. These various modules may be implemented by any combination of any quantity of software and/or hardware modules or units, and may reside within memory 135 of the server and/or client systems for execution by a corresponding processor 115.

Figure 2:
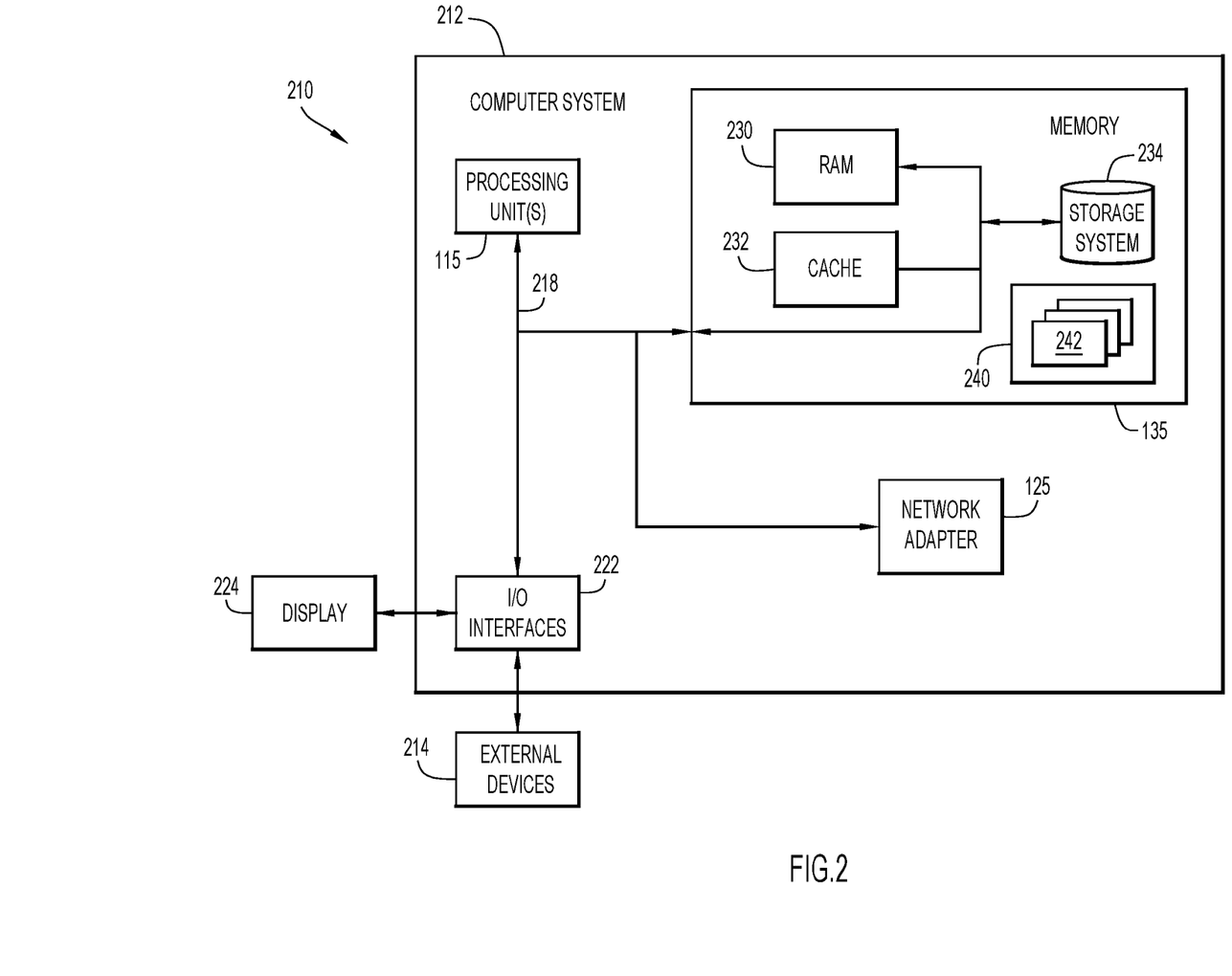
FIG. 2 is a block diagram of an example computing device according to an embodiment of the present invention.

Referring now to FIG. 2, a schematic of an example of a computing device 210 of computing environment 100 (e.g., implementing server system 110, client system 114, and/or network device 140) is shown. The computing device is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a general-purpose computing device. The components of computer system 212 may include, but are not limited to, one or more processors or processing units 115, a system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one) of program modules that are configured to carry out the functions of embodiments of the invention.

Program/utility 240, having a set (at least one) of program modules 242 (e.g., site module 116, evaluation module 120, communications module 122, evaluation agent 124, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
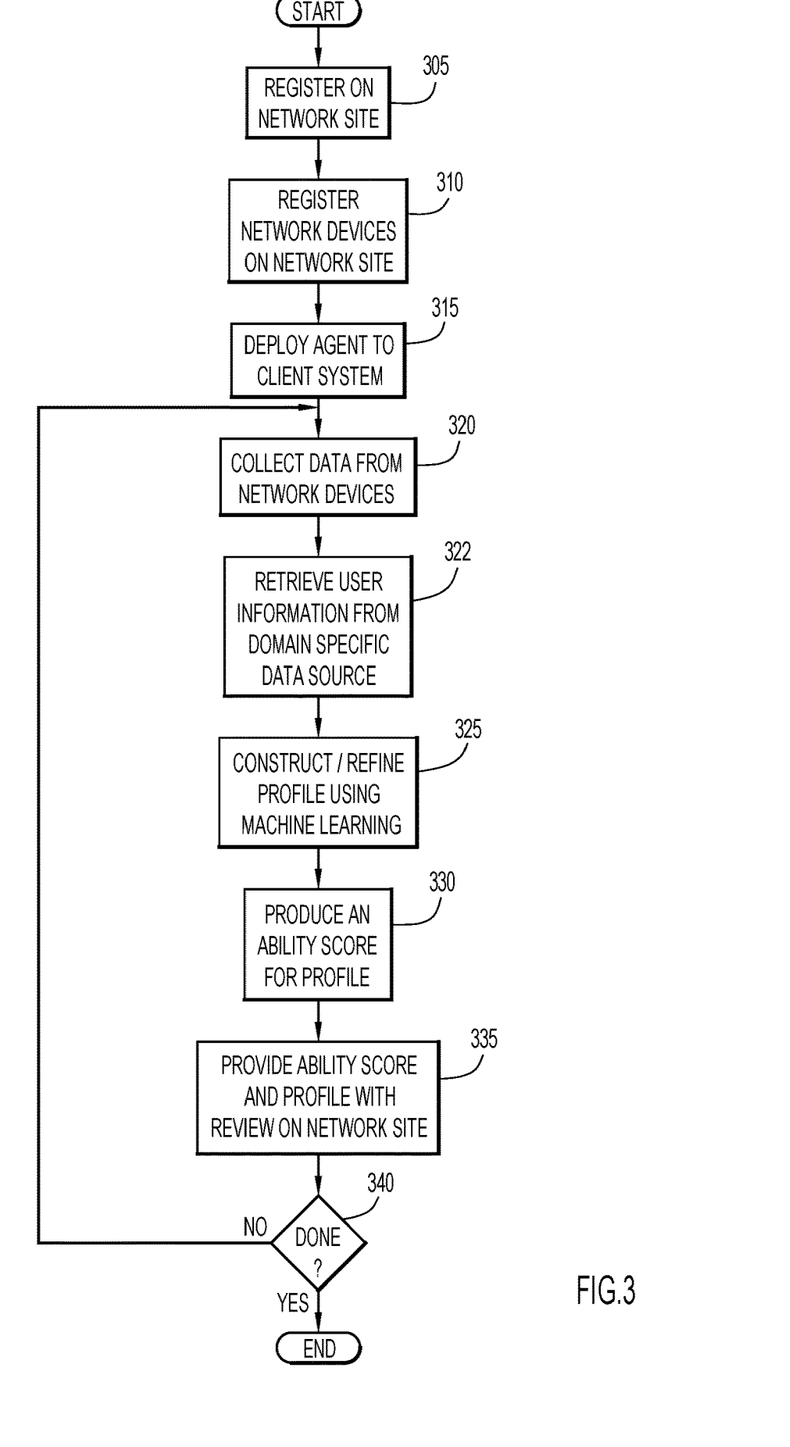
FIG. 3 is a procedural flowchart illustrating a manner of monitoring user activity to measure expertise of a user providing reviews for items according to an embodiment of the present invention.

A manner of measuring an expertise (e.g., skill level, knowledge, experience, etc.) of a user providing reviews for items by monitoring user activity (e.g., via a server system 110, a client system 114, and one or more network devices 140) is illustrated in FIG. 3. Initially, a user providing reviews for items (e.g., goods, products, services, etc.) offered by a network site registers with that network site for one or more items via site module 116 at step 305. The items for which the user desires to provide reviews may be indicated by specifying the particular items, and/or specifying the types/categories of the items (e.g., musical instruments, sports equipment, cars or other vehicles, electronic products, etc.). The reviewing user may be associated with one or more network devices 140 that monitor activity of the reviewing user relevant to the indicated items. These network devices are also registered with the network site via site module 116 at step 310. The reviewing user may access the network site on server system 110 from communications module 122 of client system 114 to provide various user related information (e.g., name, contact information, items, item categories, etc.), and information concerning the associated network devices. The network device information enables communication with the associated network devices to collect information pertaining to the monitored activity. The network device information may include network location information or address, type of device, item or item category associated with the network device, type of device sensors 145, type of information collected by device sensors 145, etc.

Once the registration of the reviewing user and associated network devices is completed, evaluation module 120 of server system 110 deploys and installs evaluation agent 124 on a client system 114 associated with the reviewing user at step 315. The client system hosting the evaluation agent is preferably a mobile device, and may be the same or a different device than client system 114 performing the registration. Alternatively, the evaluation agent may be pre-installed on the client system. The evaluation agent accesses the registered network devices 140 of the reviewing user for each of the corresponding items based on the registered device information, and retrieves data collected by the registered network devices from monitoring user activity associated with the corresponding items at step 320. The associated network devices may include various types of sensors depending upon the type of user activity being monitored. For example, a user activity pertaining to a musical instrument may be associated with sensors to collect data pertaining to notes/instrument actuators, sound, motion, patterns of notes, etc. Further, a user activity pertaining to sports equipment may be associated with sensors to collect data pertaining to motion of the equipment, position, orientation, velocity, force, etc. The collected data is analyzed as described below to determine a complexity of the activity for producing a corresponding level of expertise of the reviewing user for each of the corresponding items.

Evaluation agent 124 sends the data collected from the associated network devices 140 to evaluation module 120 of server system 110. The evaluation module further accesses a domain specific data source at step 322 to retrieve information pertaining to the reviewing user. For example, the domain specific data source may include any data source (e.g., social media or other network sites, databases, data stores, etc.) containing information (e.g., user achievements, credentials, education, experience, etc.) pertaining to the expertise of a reviewing user. The evaluation module retrieves relevant information from the domain specific data source for each of the corresponding items for which the reviewing user registered.

Evaluation module 120 constructs an expertise profile of the reviewing user for each corresponding item at step 325, where the expertise profile evolves over time based on updated user information and/or data collected by associated network devices 140 from subsequent user activity. Evaluation module 120 preferably employs a machine learning model to determine an ability score or weight indicating a level of expertise of the reviewing user with respect to a corresponding item at step 330. The ability score may be within any desired value range, and/or may be normalized to any desired value range (e.g., one to ten, one to one-hundred, etc.).

The machine learning model is trained based on a training set for an item (e.g., good, product, service, etc.) including data pertaining to collected information of a corresponding user activity, and user information from domain specific data sources. The machine learning model receives the collected information from associated network devices 140 and user information from the domain specific data source and produces the ability score for each corresponding item.

Further, the machine learning model may consider additional metrics and/or attributes, and may include various models to perform the machine learning (e.g., neural networks, mathematical/statistical models, classifiers, etc.). For example, the collected information from user activity may indicate a certain skill level (and corresponding level of expertise) with respect to a corresponding item. However, for some reasons, the user information from the domain specific data source is inconsistent with the collected information, and includes information indicating a level of expertise above or below the level of expertise indicated by the collected information. The machine learning model may learn these aspects (e.g., provide greater weight to certain factors, etc.), and employ them to determine an appropriate level of expertise.

For example, user activity for an item pertaining to a musical instrument may provide collected information from associated network devices 140 concerning the notes played, sounds produced, and manipulation of actuators on the musical instrument. The sounds and pattern of notes/actuation provide an indication of the complexity of the music and quality of the result. A positive result produced for complex music indicates a relatively high skill level (and corresponding level of expertise) of the reviewing user which is learned by the machine learning model.

By way of further example, user activity for an item pertaining to sports equipment, such as a racquet, may provide collected information from associated network devices 140 concerning the orientation of the racquet, acceleration of the racquet, velocity of the racquet, and force of impact of the racquet on an object. These factors provide an indication of the skill level of the reviewing user, where a certain position/orientation, and a high velocity, acceleration, and force of impact indicates a relatively high skill level (and corresponding level of expertise) of the reviewing user which is learned by the machine learning model.

The expertise profile for each corresponding item is refined over time as additional information from the domain specific data source and associated network devices 140 become available. For example, evaluation agent 124 may periodically (e.g., at any desired time interval, etc.), or at predetermined times, retrieve information from associated network devices 140. Evaluation module 120 may periodically (e.g., at any desired time interval, etc.), or at predetermined times, retrieve user information from domain specific data sources. Alternatively, the evaluation module and evaluation agent may retrieve the information each time the reviewing user provides or updates a review.

The additional information is aggregated with prior information (e.g., averaged, statistical analysis, updated, etc.) and provided to the machine learning model to update the ability score for the reviewing user for the corresponding item. Accordingly, the ability score of the reviewing user for a corresponding item is adjusted according to new user activity and/or updates to the user information associated with the corresponding item.

Alternatively, the ability score may be determined based on a weighted combination of attributes for a corresponding item. Each item may be associated with a schedule of weights to be applied to corresponding attributes. For example, weights may be assigned to various attributes within the user information (e.g., user achievements, credentials, education, experience, etc.) and collected information (e.g., complexity of activity, performance of aspects of the activity, etc.) for a corresponding item. The weights of the appropriate schedule may be applied to the corresponding attributes of the reviewing user and collected information for an item and combined (e.g., summed, etc.) to produce the ability score for the item.

The expertise profile for each corresponding item is refined over time as additional or updated information from the domain specific data source and associated network devices 140 become available. For example, evaluation agent 124 may periodically (e.g., at any desired time interval, etc.), or at predetermined times, retrieve information from associated network devices 140. Evaluation module 120 may periodically (e.g., at any desired time interval, etc.), or at predetermined times, retrieve user information from domain specific data sources. Alternatively, the evaluation module and evaluation agent may retrieve the information each time the reviewing user provides or updates a review.

The additional information is aggregated with prior information (e.g., averaged, statistical analysis, updated, etc.) and the appropriate schedules of weights are applied to update the ability score for the reviewing user for the corresponding item. Accordingly, the ability score of the reviewing user for a corresponding item is adjusted in accordance with new user activity and/or updates to the user information associated with the corresponding item.

When the reviewing user provides a review for an item on the network site, site module 116 associates the corresponding expertise profile of the reviewing user with the review. When the review of an item is displayed on the network site, the expertise profile of the reviewing user is provided with the review on the network site at step 335. The expertise profile, by way of example, may indicate the name of the reviewing user, the ability score, and a description of the relevant skills and/or various attributes of the reviewing user. For example, a potential purchaser may view a tennis racquet on a network site that has been reviewed by a reviewing user with an expertise profile. The tennis racquet is displayed with a review and corresponding expertise profile of the reviewing user. The expertise profile may indicate an ability score of 7, and that the reviewing user is an intermediate club level player, has seven years of experience, won two club tournaments, uses a specified racquet, and has coaching experience at the club. However, the expertise profile may include any relevant information. The potential purchaser may determine a credibility of the review based on the expertise profile of the reviewing user, and purchase the tennis racquet with a high degree of confidence.

The above process is repeated from step 320 to update the expertise profile and ability score of the reviewing user based on updated user and collected information until termination (e.g., removal of the user as a reviewer, etc.) as determined at step 340. Accordingly, the expertise of the reviewing user may be continuously monitored (e.g., by network devices 140, etc.) and dynamically updated for corresponding items (e.g., as additional user activities are performed and user information is updated) to maintain a current level of expertise for the reviewing user. Thus, the level of expertise for the reviewing user may be modified as the skills in the monitored user activities change over time (e.g., improving skills increase the level of expertise, decreasing skills reduce the level of expertise, etc.).

Figure 4:
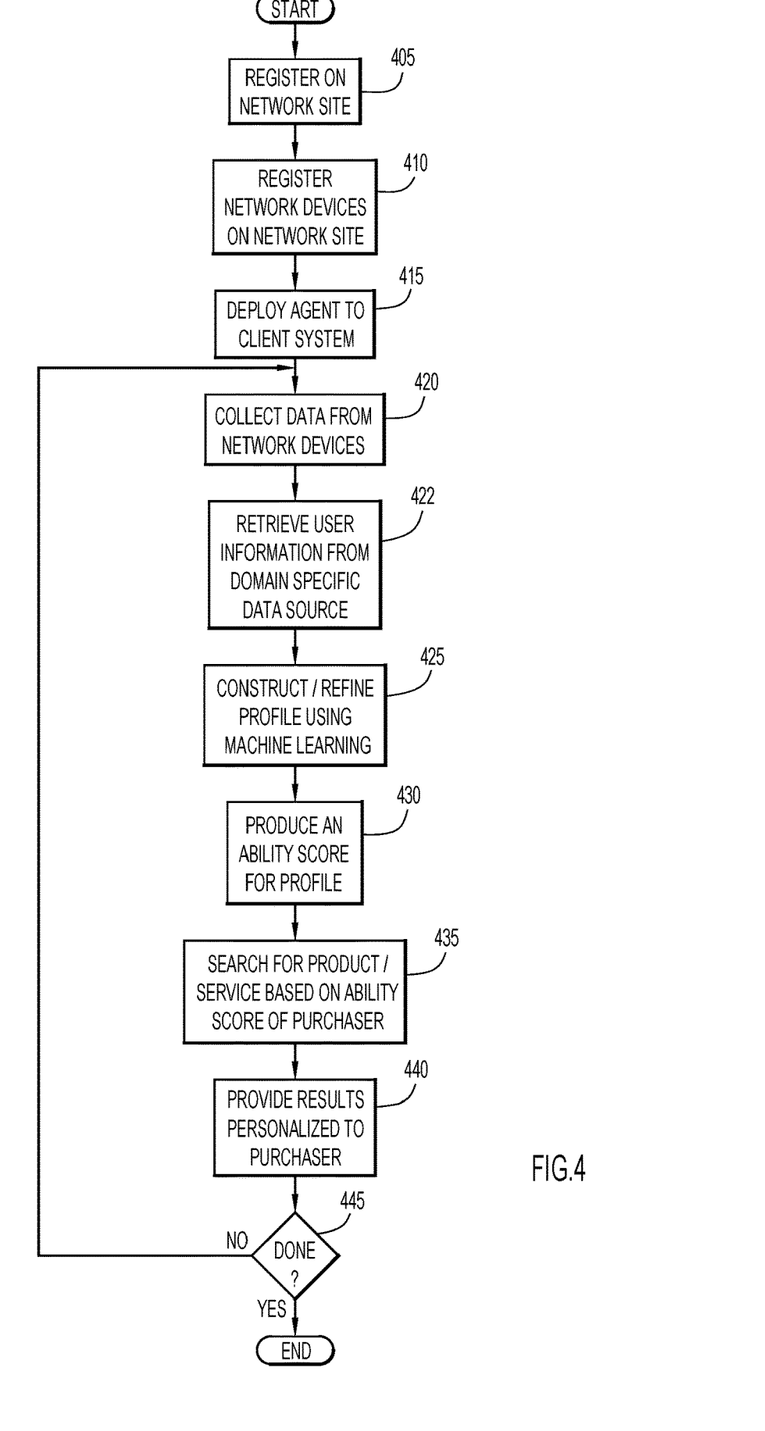
FIG. 4 is a procedural flowchart illustrating a manner of performing searches for items on a network site according to an expertise of a user purchasing the items according to an embodiment of the present invention.

The ability score may be applied to a user purchasing an item to identify relevant items for the user. A manner of measuring an expertise (e.g., skill level, knowledge, experience, etc.) of a user purchasing items by monitoring user activity (e.g., via a server system 110, a client system 114, and one or more network devices 140) is illustrated in FIG. 4. Initially, a user seeking to purchase items (e.g., goods, products, services, etc.) offered by a network site registers with that network site for one or more items via site module 116 at step 405. The items for which the user seeks to purchase may be indicated by specifying the particular items, and/or specifying the types/categories of the items (e.g., musical instruments, sports equipment, cars or other vehicles, electronic products, etc.). The purchasing user may be associated with one or more network devices 140 that monitor activity of the purchasing user relevant to the indicated items. These network devices are also registered with the network site via site module 116 at step 410. The purchasing user may access the network site on server system 110 from communications module 122 of client system 114 to provide various user related information (e.g., name, contact information, items, item categories, etc.), and information concerning the associated network devices. The network device information enables communication with the associated network devices to collect information pertaining to the monitored activity. The network device information may include network location information or address, type of device, item or item category associated with the network device, type of device sensors 145, type of information collected by device sensors 145, etc.

Once the registration of the purchasing user and associated network devices is completed, evaluation module 120 of server system 110 deploys and installs evaluation agent 124 on a client system 114 associated with the reviewing user at step 415. Alternatively, the evaluation agent may be pre-installed on the client system. The client system hosting the evaluation agent is preferably a mobile device, and may be the same or a different device than client system 114 performing the registration. The evaluation agent accesses the registered network devices 140 of the purchasing user for each of the corresponding items based on the registered device information, and retrieves data collected by the registered network devices from monitoring user activity associated with the corresponding items at step 420. The associated network devices may include various types of sensors depending upon the type of user activity being monitored. For example, a user activity pertaining to a musical instrument may be associated with sensors to collect data pertaining to notes/instrument actuators, sound, motion, patterns of notes, etc. Further, a user activity pertaining to sports equipment may be associated with sensors to collect data pertaining to motion of the equipment, position, orientation, velocity, force, etc. The collected data is analyzed as described below to determine a complexity of the activity for producing a corresponding level of expertise of the purchasing user for each of the corresponding items.

Evaluation agent 124 sends the data collected from the associated network devices 140 to evaluation module 120 of server system 110. The evaluation module further accesses a domain specific data source at step 422 to retrieve information pertaining to the purchasing user. For example, the domain specific data source may include any data source (e.g., social media or other network sites, databases, data stores, etc.) containing information (e.g., user achievements, credentials, education, experience, etc.) pertaining to the expertise of a purchasing user. The evaluation module retrieves relevant information from the domain specific data source for each of the corresponding items for which the purchasing user registered.

Evaluation module 120 constructs an expertise profile of the purchasing user for each corresponding item at step 425, where the expertise profile evolves over time based on updated user information and/or data collected by associated network devices 140 from subsequent user activity. Evaluation module 120 preferably employs a machine learning model to determine an ability score or weight indicating a level of expertise of the purchasing user with respect to a corresponding item at step 430. The ability score may be within any desired value range, and/or may be normalized to any desired value range (e.g., one to ten, one to one-hundred, etc.).

The machine learning model is trained based on a training set for an item (e.g., good, product, service, etc.) including data pertaining to collected information of a corresponding user activity, and user information from domain specific data sources. The machine learning model receives the collected information from associated network devices 140 and user information from the domain specific data source and produces the ability score for each corresponding item.

Further, the machine learning model may consider additional metrics and/or attributes, and may include various models to perform the machine learning (e.g., neural networks, mathematical/statistical models, classifiers, etc.). For example, the collected information from user activity may indicate a certain skill level (and corresponding level of expertise) with respect to a corresponding item. However, for some reasons, the user information from the domain specific data source is inconsistent with the collected information, and includes information indicating a level of expertise above or below the level of expertise indicated by the collected information. The machine learning model may learn these aspects (e.g., provide greater weight to certain factors, etc.), and employ them to determine an appropriate level of expertise.

For example, user activity for an item pertaining to a musical instrument may provide collected information from associated network devices 140 concerning the notes played, sounds produced, and manipulation of actuators on the musical instrument. The sounds and pattern of notes/actuation provide an indication of the complexity of the music and quality of the result. A positive result produced for complex music indicates a relatively high skill level (and corresponding level of expertise) of the purchasing user which is learned by the machine learning model.

By way of further example, user activity for an item pertaining to sports equipment, such as a racquet, may provide collected information from associated network devices 140 concerning the orientation of the racquet, acceleration of the racquet, velocity of the racquet, and force of impact of the racquet on an object. These factors provide an indication of the skill level of the purchasing user, where a certain position/orientation, and a high velocity, acceleration, and force of impact indicates a relatively high skill level (and corresponding level of expertise) of the purchasing user which is learned by the machine learning model.

The expertise profile for each corresponding item is refined over time as additional information from the domain specific data source and associated network devices 140 become available. For example, evaluation agent 124 may periodically (e.g., at any desired time interval, etc.), or at predetermined times, retrieve information from associated network devices 140. Evaluation module 120 may periodically (e.g., at any desired time interval, etc.), or at predetermined times, retrieve user information from domain specific data sources. Alternatively, the evaluation module and evaluation agent may retrieve the information each time the purchasing user seeks to purchase an item.

The additional information is aggregated with prior information (e.g., averaged, statistical analysis, updated, etc.) and provided to the machine learning model to update the ability score for the purchasing user for the corresponding item. Accordingly, the ability score of the purchasing user for a corresponding item is adjusted according to new user activity and/or updates to the user information associated with the corresponding item.

Alternatively, the ability score may be determined based on a weighted combination of attributes for a corresponding item. Each item may be associated with a schedule of weights to be applied to corresponding attributes. For example, weights may be assigned to various attributes within the user information (e.g., user achievements, credentials, education, experience, etc.) and collected information (e.g., complexity of activity, performance of aspects of the activity, etc.) for a corresponding item. The weights of the appropriate schedule may be applied to the corresponding attributes of the purchasing user and collected information for an item and combined (e.g., summed, etc.) to produce the ability score for the item.

The expertise profile for each corresponding item is refined over time as additional or updated information from the domain specific data source and associated network devices 140 become available. For example, evaluation agent 124 may periodically (e.g., at any desired time interval, etc.), or at predetermined times, retrieve information from associated network devices 140. Evaluation module 120 may periodically (e.g., at any desired time interval, etc.), or at predetermined times, retrieve user information from domain specific data sources. Alternatively, the evaluation module and evaluation agent may retrieve the information each time the purchasing user seeks to purchase an item.

The additional information is aggregated with prior information (e.g., averaged, statistical analysis, updated, etc.) and the appropriate schedules of weights are applied to update the ability score for the purchasing user for the corresponding item. Accordingly, the ability score of the purchasing user for a corresponding item is adjusted in accordance with new user activity and/or updates to the user information associated with the corresponding item.

When the purchasing user enters a search on the network site for an item, site module 116 compares the expertise profile of the purchasing user to descriptions and/or reviews for items to identify candidate items appropriate for the purchasing user at step 435. For example, the comparison may be based on an analysis (e.g., natural language processing, etc.) of item descriptions, reviews, and/or expertise profile of the reviewing and purchasing users (e.g., the ability score and description of skills and/or attributes of the purchasing user may be compared to content of the item descriptions, reviews and expertise profiles of the reviewing users, etc.).

The identified items are displayed with the purchasing user expertise profile, corresponding reviews (and reviewing user expertise profiles), and recommendations at step 440. The recommendations may be determined from an analysis (e.g., natural language processing, etc) of item descriptions, reviews, and/or expertise profile of the reviewing users. The expertise profile for the purchasing and reviewing users, by way of example, may indicate the name, the ability score, and a description of the relevant skills and/or various attributes.

For example, a tennis racquet on a network site may be identified for a purchasing user based on the expertise profile of that purchasing user. The tennis racquet has been reviewed by a reviewing user with an expertise profile. The tennis racquet is displayed with the purchasing user expertise profile (indicating the ability score and descriptions of the skills and/or attributes of the purchasing user), a review and corresponding expertise profile of the reviewing user, and recommendations. In this example, the expertise profile of the purchasing user may indicate an intermediate level player. The expertise profile of the reviewing user may indicate an ability score of 7, and that the reviewing user is an intermediate club level player, has seven years of experience, won two club tournaments, uses a specified racquet, and has coaching experience at the club. The recommendations may indicate that the tennis racquet is suitable for intermediate players, tailored for aggressive players at the net, and suitable for players having a fast game. However, the expertise profile and recommendations may include any relevant information.

Thus, the items produced from the search are personalized to the abilities of the purchasing user to provide enhanced searching capabilities. This reduces the number of searches and improves processing performance since less searches would need to be performed and less computing time is needed to identify relevant information. Further, the purchasing user may determine a credibility of the review based on the expertise profile of the reviewer, and purchase the item with a high degree of confidence.

The above process is repeated from step 420 to update the expertise profile and ability score of the purchasing user based on updated user and collected information until termination (e.g., removal of the purchasing user, etc.) as determined at step 445. Accordingly, the level of expertise of the purchasing user may be continuously monitored (e.g., by network devices 140, etc.) and dynamically updated for corresponding items (e.g., as additional user activities are performed and user information is updated) to maintain a current level of expertise for the purchasing user. Thus, the level of expertise for the purchasing user may be modified as the skills in the monitored user activities change over time (e.g., improving skills increase the level of expertise, decreasing skills reduce the level of expertise, etc.). This enables searches to be tailored or personalized to the user and identify extremely relevant items.

Operation of an embodiment of the present invention is described with respect to an example pertaining to electric guitars. A reviewing user expertise is automatically established and validated using corresponding contextual Internet of Things (IoT) devices.

Initially, selecting an electric guitar (or any other musical instrument) from a network (or e-commerce) site is challenging, especially for beginners. Unlike most other products, these types of products are better assessed by a person skilled in use of the particular musical instrument. A purchasing user prefers to buy based on the actual expertise of a reviewer who has reviewed the musical instrument.

An embodiment of the present invention may be utilized to determine the credibility of the reviewer using contextual IoT devices of the reviewer. Specifically, guitars employ inbuilt sensors referred to as a pickup. A pickup is a transducer that senses and converts mechanical vibrations to an electrical signal. The electrical signal is amplified to produce musical sounds. Electric guitars use magnetic pickups, while acoustic guitars often use a piezoelectric pickup, where the signal from a pickup can be recorded. In addition, sensors may also digitally capture complex guitar-playing movements. The pickup and other sensors may be connected to a network and employed as IoT devices.

When a guitarist plays a guitar, the IoT devices capture information indicating the style (e.g., blues, jazz, rock, classical, etc.) of music and expertise of the guitarist (e.g., based on the complex notes, style of playing, duration of playing, chord sequence followed, style of strumming, etc). The guitarist registers the IoT devices (including the guitar sensors) with the network (or e-commerce) site, and evaluation agent 124 collects and provides the captured information from the IoT devices to evaluation module 120. The evaluation module analyzes the data stream from these IoT devices as described above (e.g., FIG. 3) to establish a certain expertise level associated with this guitarist. The expertise level is displayed with any reviews the guitarist provides for guitars on the network (or e-commerce) site.

Operation of an embodiment of the present invention is described with respect to a further example pertaining to tennis related equipment. In this example case, a user may be providing a review for tennis related equipment, such as a tennis racquet. Tennis related sensing devices may include sensors disposed on the butt of the racquet, wrist of the player, and/or the racquet strings, and/or built into the grip. These sensors may be connected to a network and employed as Internet of Things (IoT) devices. The reviewing user registers the tennis-related Internet of Things (IoT) devices with a network (or e-commerce) site, and evaluation agent 124 collects and provides the captured information from the IoT devices to evaluation module 120. The evaluation module analyzes the data stream from these IoT devices as described above (e.g., FIG. 3) to establish a certain expertise level for the reviewing user. The expertise level is displayed with any reviews the reviewing user provides for tennis racquets on the network (or e-commerce) site.

Thus, in the above examples, when a reviewing user provides a corresponding review, a rating indicator is provided showing the reviewer expertise in the particular domain. This rating indicator is automatically generated by embodiments of the present invention analyzing a data feed from contextual IoT devices monitoring corresponding activities of the reviewing user (and/or user information from domain specific data sources).

By way of another example of operation of an embodiment of the present invention, a tennis player seeking to purchase a tennis racquet may be monitored to establish a certain level of expertise for the tennis player. This may be accomplished in substantially the same manner described above (e.g., FIG. 4). When the tennis player performs a search of the network (or e-commerce) site for tennis racquets, the level of expertise of the tennis player is utilized to identify tennis racquets commensurate with the level of expertise of the tennis player. The level of expertise of the tennis player may be compared to item descriptions, reviews, and expertise profiles of the reviewers to determine the items commensurate with the level of expertise of the tennis player.

It will be appreciated that the embodiments described above and illustrated in the drawings represent only a few of the many ways of implementing embodiments for measuring user expertise utilizing networked sensing devices.

The environment of the present invention embodiments may include any number of computer or other processing systems (e.g., client or end-user systems, server systems, network devices, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, site module, evaluation module, communications module, evaluation agent, etc.). These systems may include any types of monitors and input devices (e.g., keyboard, mouse, voice recognition, etc.) to enter and/or view information.

It is to be understood that the software (e.g., site module, evaluation module, communications module, evaluation agent, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., site module, evaluation module, communications module, evaluation agent, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., network device information, user information, weights, expertise profiles, ability scores, registration information, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., item information, registration information, reviews, expertise profiles, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report or display of items may include any information arranged in any fashion, and may be configurable based on rules or other criteria to provide desired information to a user (e.g., item, item description, expertise profiles, etc.).

The present invention embodiments are not limited to the specific tasks or algorithms described above, but may be utilized for monitoring user activities to determine an expertise of a user for any desired subject areas (e.g., relating to any goods, products, and/or services). Embodiments of the present invention may determine a level of expertise of reviewing users, purchasing users, users of a network or other site, or any combination thereof. Accordingly, network sites may offer items, with reviews and expertise profiles of corresponding reviewers, to purchasing users that may or may not have an expertise profile. Similarly, network sites may offer items to purchasing users that have an expertise profile, where one or more of the items may have reviews without a corresponding reviewer expertise profile. In addition, the items provided by the network site may have any quantity of reviews with corresponding reviewer expertise profiles, any quantity of reviews without corresponding reviewer expertise profiles, or any combination thereof.

The network devices may include any quantity of any types sensors to measure any suitable conditions (e.g., medical, physiological, external conditions, device internal conditions, motion, position, orientation, acceleration, velocity, sound, force, etc.). The domain specific data sources may include any data sources including information pertaining to the user. The ability score may be within any desired range, and may be any type of indicator (e.g., numeric, alphanumeric, labels (e.g., high, medium, low, etc.), symbols, icons, etc.). The expertise profiles may include any desired information pertaining to the expertise of a user (e.g., ability score, credentials, education, experience, achievements, etc.). The expertise profiles may be displayed with corresponding items in any desired fashion (e.g., a link to another page or site displaying the review and/or expertise profile, displayed next to the item, etc.).

An expertise profile of a purchasing user may be compared to item information (e.g., item information, review information, reviewer information and/or expertise profile, etc.) in any manner to identify relevant items. For example, the ability score of the purchasing user may be within a desired range of the ability score of one or more reviewers of the item. Natural language processing (e.g., linguistic analysis, sentiment analysis, contextual analysis, etc.) may be employed on the item description and/or expertise profiles to determine relevant items.

The expertise profiles may be updated at any desired time intervals (e.g., at any periodic time intervals, at any specific times, etc.) or in response to any conditions (e.g., review an item, search for an item, purchase an item, registration, etc.). Further, the level of expertise may be determined for any users of any network sites where credibility of a user may be beneficial (e.g., communication sites (e.g., threads, blogs, etc.), social media sites to verify information, e-commerce sites, product/service review sites, etc.). A user may register with these sites based on categories or areas of subject matter (e.g., specific topics or areas of subject matter, activities or tasks, occupation, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of measuring user expertise comprising:

monitoring first users each manipulating a corresponding first item including a first plurality of networked sensing devices to perform one or more activities, wherein the corresponding first item and the one or more activities of the first users are associated with a subject area;

analyzing, via a processor, information associated with the one or more activities of the first users from the first plurality of networked sensing devices to determine a level of expertise of each of the first users with respect to the subject area, wherein the level of expertise of each first user is represented as an ability score within a numeric range determined based on attributes of performance of the one or more activities by that first user, and wherein a different level of expertise corresponds to a different range of values within the numeric range;

monitoring a second user manipulating a second item including a second plurality of networked sensing devices to perform one or more activities, wherein the second item and the one or more activities of the second user are associated with the subject area;

analyzing, via a processor, information associated with the one or more activities of the second user from the second plurality of networked sensing devices to determine a level of expertise of the second user with respect to the subject area, wherein the level of expertise of the second user is represented as an ability score within the numeric range determined based on attributes of performance of the one or more activities by the second user;

generating, via a processor, reviews by the first users for items offered on a network site, wherein the items on the network site correspond to the corresponding first item of the first users and pertain to the subject area;

conducting, via a processor, a search for the second user on the network site for candidate items pertaining to the subject area and commensurate with the level of expertise of the second user by comparing the ability score of the second user with the ability scores of the first users associated with the reviews for the items on the network site and determining the candidate items commensurate with the level of expertise of the second user as results for the search based on the ability scores of the associated first users having a same value range as the ability score of the second user;

displaying, via a processor, the candidate items on the network site with the reviews and determined level of expertise of the first users associated with the candidate items; and continuously monitoring and dynamically adjusting the ability scores of the first users and the second user to maintain current levels of expertise and modify results of the search based on the adjusted ability scores.

2. The method of claim 1, further comprising:
registering the first users and the first plurality of networked sensing devices with the network site.

3. The method of claim 1, wherein analyzing the information associated with the one or more activities of the first users further comprises:
applying the information associated with the one or more activities of the first users to a machine learning model to determine the level of expertise of each of the first users.

4. The method of claim 1, wherein the first plurality of networked sensing devices include devices configured for Internet of Things (IoT).

5. A system of measuring user expertise comprising:
a first plurality of networked sensing devices to monitor first users manipulating a corresponding first item to perform one or more activities, wherein the corresponding first item and the one or more activities of the first users are associated with a subject area;
a second plurality of networked sensing devices to monitor a second user manipulating a second item to perform one or more activities, wherein the second item and the one or more activities of the second user are associated with the subject area; and
a processor configured to:
analyze information associated with the one or more activities of the first users from the first plurality of networked sensing devices to determine a level of expertise of each of the first users with respect to the subject area, wherein the level of expertise of each first user is represented as an ability score within a numeric range determined based on attributes of performance of the one or more activities by that first user, and wherein a different level of expertise corresponds to a different range of values within the numeric range;
analyze information associated with the one or more activities of the second user from the second plurality of networked sensing devices to determine a level of expertise of the second user with respect to the subject area, wherein the level of expertise of the second user is represented as an ability score within the numeric range determined based on attributes of performance of the one or more activities by the second user;
generate reviews by the first users for items offered on a network site, wherein the items on the network site correspond to the corresponding first item of the first users and pertain to the subject area;
conduct a search for the second user on the network site for candidate items pertaining to the subject area and commensurate with the level of expertise of the second user by comparing the ability score of the second user with the ability scores of the first users associated with the reviews for the items on the network site and determining the candidate items commensurate with the level of expertise of the second user as results for the search based on the ability scores of the associated first users having a same value range as the ability score of the second user;

display the candidate items on the network site with the reviews and determined level of expertise of the first users associated with the candidate items; and continuously monitor and dynamically adjust the ability scores of the first users and the second user to maintain current levels of expertise and modify results of the search based on the adjusted ability scores.

6. The system of claim 5, wherein the first plurality of networked sensing devices include devices configured for Internet of Things (IoT), and the processor is further configured to:
register the first users and the first plurality of networked sensing devices with the network site.

7. The system of claim 5, wherein analyzing the information associated with the one or more activities of the first users further comprises:
applying the information associated with the one or more activities of the first users to a machine learning model to determine the level of expertise of each of the first users.

8. A computer program product for measuring user expertise, the computer program product comprising one or more computer readable storage media collectively having program instructions embodied therewith, the program instructions executable by a processor to cause the processor to:
monitor first users each manipulating a corresponding first item including a first plurality of networked sensing devices to perform one or more activities, wherein the corresponding first item and the one or more activities of the first users are associated with a subject area;
analyze information associated with the one or more activities of the first users from the first plurality of networked sensing devices to determine a level of expertise of each of the first users with respect to the subject area, wherein the level of expertise of each first user is represented as an ability score within a numeric range determined based on attributes of performance of the one or more activities by that first user, and wherein a different level of expertise corresponds to a different range of values within the numeric range;
monitor a second user manipulating a second item including a second plurality of networked sensing devices to perform one or more activities, wherein the second item and the one or more activities of the second user are associated with the subject area;
analyze information associated with the one or more activities of the second user from the second plurality of networked sensing devices to determine a level of expertise of the second user with respect to the subject area, wherein the level of expertise of the second user is represented as an ability score within the numeric range determined based on attributes of performance of the one or more activities by the second user;
generate reviews by the first users for items offered on a network site, wherein the items on the network site correspond to the corresponding first item of the first users and pertain to the subject area;

conduct a search for the second user on the network site for candidate items pertaining to the subject area and commensurate with the level of expertise of the second user by comparing the ability score of the second user with the ability scores of the first users associated with the reviews for the items on the network site and determining the candidate items commensurate with the level of expertise of the second user as results for the search based on the ability scores of the associated first users having a same value range as the ability score of the second user;

display the candidate items on the network site with the reviews and determined level of expertise of the first users associated with the candidate items; and continuously monitor and dynamically adjust the ability scores of the first users and the second user to maintain current levels of expertise and modify results of the search based on the adjusted ability scores.

9. The computer program product of claim 8, wherein the program instructions further cause the processor to:

register the first users and the first plurality of networked sensing devices with the network site.

10. The computer program product of claim 8, wherein analyzing the information associated with the one or more activities of the first users further comprises:

applying the information associated with the one or more activities of the first users to a machine learning model to determine the level of expertise of each of the first users.

11. The computer program product of claim 8, wherein the first plurality of networked sensing devices include devices configured for Internet of Things (IoT).

* * * * *